(12) United States Patent
Kim et al.

(10) Patent No.: US 7,978,662 B2
(45) Date of Patent: Jul. 12, 2011

(54) METHOD AND APPARATUS FOR TRANSMITTING/RECEIVING DOWNLINK DATA FOR UE IN SOFT HANDOVER REGION IN AN OFDM SYSTEM

(75) Inventors: Young-Bum Kim, Seoul (KR); Hwan-Joon Kwon, Hwaseong-si (KR); Ju-Ho Lee, Suwon-si (KR); Dong-Hee Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1207 days.

(21) Appl. No.: 11/475,243

(22) Filed: Jun. 27, 2006

(65) Prior Publication Data

US 2006/0293056 A1 Dec. 28, 2006

(30) Foreign Application Priority Data

Jun. 27, 2005 (KR) ........................ 10-2005-0055979

(51) Int. Cl.
*H04B 1/707* (2006.01)
*H04B 7/216* (2006.01)
*H04W 36/00* (2009.01)

(52) U.S. Cl. .................. 370/335; 370/331; 370/330

(58) Field of Classification Search .................. None
See application file for complete search history.

(56) References Cited

U.S. PATENT DOCUMENTS

| | | | | |
|---|---|---|---|---|
| 6,414,947 B1 * | 7/2002 | Legg et al. | ...................... | 370/331 |
| 6,493,333 B1 * | 12/2002 | Kim et al. | ...................... | 370/342 |
| 7,203,519 B2 * | 4/2007 | Ylitalo | ........................ | 455/562.1 |
| 7,313,398 B1 * | 12/2007 | Ramahi | .......................... | 455/436 |
| 2001/0007552 A1 * | 7/2001 | Schiff et al. | ..................... | 370/331 |
| 2002/0077113 A1 * | 6/2002 | Spaling et al. | ................. | 455/453 |
| 2004/0131007 A1 * | 7/2004 | Smee et al. | ..................... | 370/208 |
| 2004/0224691 A1 | 11/2004 | Hadad | | |
| 2005/0002478 A1 * | 1/2005 | Agami et al. | .................. | 375/345 |
| 2005/0063339 A1 * | 3/2005 | Jeong et al. | ..................... | 370/331 |
| 2006/0182063 A1 * | 8/2006 | Ma et al. | ........................ | 370/331 |
| 2006/0209754 A1 * | 9/2006 | Ji et al. | ............................ | 370/329 |
| 2006/0233221 A1 * | 10/2006 | Xu et al. | ........................ | 375/147 |

FOREIGN PATENT DOCUMENTS

| | | |
|---|---|---|
| EP | 1 458 210 A | 9/2004 |
| KR | 2002-0008073 | 1/2002 |
| KR | 10-2002-0061398 A | 7/2002 |
| KR | 10-2005-0000202 A | 1/2005 |
| WO | WO 2004/064294 A2 | 7/2004 |
| WO | WO 2005/048640 A | 5/2005 |

* cited by examiner

*Primary Examiner* — Rafael Pérez-Gutiérrez
*Assistant Examiner* — Frank Donado
(74) *Attorney, Agent, or Firm* — Roylance, Abrams, Berdo & Goodman L.L.P.

(57) ABSTRACT

A method and apparatus for transmitting and receiving downlink data for signal combining at a UE in an OFDM cellular system are provided. A Node B sends combining information to the UE, and combinable cells use the same radio resources and the same scrambling sequence in data transmission to the UE. Therefore, the UE can receive naturally combined data without an additional operation. Also, the UE combines channel estimates calculated using pilot signals received form the cells and compensates the combined data signal using the combined channel estimate.

40 Claims, 11 Drawing Sheets

METHOD AND APPARATUS FOR TRANSMITTING/RECEIVING DOWNLINK DATA FOR UE IN SOFT HANDOVER REGION IN AN OFDM SYSTEM

CROSS-REFERENCE TO RELATED APPLICATIONS

This application claims priority under 35 U.S.C. §119 to application Ser. No. 2005-55979 filed in the Korean Intellectual Property Office on Jun. 27, 2005, the entire disclosure of which is hereby incorporated by reference.

BACKGROUND OF THE INVENTION

1. Field of the Invention

The present invention relates generally to an Orthogonal Frequency Division Multiplexing (OFDM) system. More particularly, the present invention relates to a method and apparatus for transmitting/receiving downlink data such that a User Equipment (UE) located in a Soft HandOver (SHO) region can combine data received from a plurality of cells.

2. Description of the Related Art

Recently, OFDM has widely been exploited for broadcasting and mobile communication systems. Due to the advantages of cancellation of interference between multi-path signals inherent to a radio channel, orthogonality among multiple access users, and efficient frequency use, OFDM out performs Code Division Multiple Access (CDMA) in application to high-speed data transmission and broadband systems. OFDM is a special case of MCM (Multi-Carrier Modulation) in which a serial symbol sequence is converted to parallel symbol sequences and modulated to mutually orthogonal subcarriers or subchannels, prior to transmission.

FIGS. 1A and 1B are block diagrams of a transmitter and a receiver, respectively in a typical OFDM system.

Referring to FIG. 1A, in the transmitter, a channel encoder 102 channel-encodes an input information bit stream. The channel encoder 102 may be a convolutional encoder, a turbo encoder or a Low Density Parity Check (LDPC) encoder. A modulator 104 modulates the coded stream by Quadrature Phase Shift Keying (QPSK), 8-ary PSK (8PSK), 16-ary Quadrature Amplitude Modulation (16QAM), or 64-ary QAM (64 QAM). While not shown, it is clearly to be understood to those skilled in the art that a rate matcher can be interposed between the channel encoder 102 and the modulator 104, for repetition and puncturing.

A Serial-to-Parallel (S/P) converter 106 parallelizes the modulated signal, and an Inverse Fast Fourier Transform (IFFT) processor 108 IFFT-processes the parallel signals. A Parallel-to-Serial (P/S) converter 110 serializes the IFFT signals (in other words an OFDM symbol). A Cyclic Prefix (CP) adder 112 adds a predetermined CP to the serial signal. A Radio Frequency (RF) transmitter 114 processes the CP-added signal by frequency upconversion, filtering and amplification and sends the resulting OFDM signal.

The OFDM receiver illustrated in FIG. 1B operates in the reverse order to the operation of the transmitter.

Referring to FIG. 1B, upon receipt of an OFDM signal at the OFDM receiver, an RF receiver 116 amplifies and downconverts the RF signal, and a CP remover 118 eliminates a CP from the OFDM signal received from the RF receiver 116. An S/P converter 120 parallelizes the CP-free signal, a Fast Fourier Transform (FFT) processor 122 FFT-processes the parallel signals, and a P/S converter 124 serializes the FFT signals.

A channel compensator 126 performs channel estimation and channel compensation on the serial signal. A demodulator 128 demodulates the channel-compensated signal in accordance with the modulation scheme used in the modulator 104 of the OFDM transmitter, that is, one of QPSK, 8PSK, 16QAM and 64QAM. A channel decoder 130 decodes the demodulated signal, thereby finally recovering an information bit stream. While not shown, it is to be clearly understood to those skilled in the art that a rate dematcher can be interposed between the demodulator 128 and the channel decoder 130, for performing the operation of the rate matcher in a reverse order.

For application of the OFDM system to a broadcasting or mobile communication system, aside from data, the transmitter must send a pilot signal and control information to enable demodulation and decoding of the data at the receiver. The pilot signal has a pattern known to both the transmitter and the receiver. When a signal is distorted during transmission on a radio fading channel, the receiver estimates the signal distortion and eliminates it using the pilot signal. The control information provides information about a modulation and channel coding scheme, a data block size, and Hybrid Automatic Repeat reQuest (HARQ) information such as a subpacket IDentifier (ID), used for the transmission data. The receiver demodulates and decodes the received data based on the control information.

Like other cellular communication systems, the OFDM cellular communication system requires a technique for improving the reception performance of a UE located at a cell boundary. For this purpose, the received Signal-to-Interference and Noise Ratio (SINR) of the UE is increased by reducing interference from neighbor cells. Each cell uses a randomizer for data transmission in order to reduce the neighbor cell interference. The randomizer is implemented using a scrambling sequence. The transmitter multiplies a transmission signal by a scrambling sequence specific to its cell, to thereby reduce the neighbor cell interference.

For improving the reception performance of a UE in an SHO region, i.e. a boundary of neighbor cells, besides the neighbor cell interference reduction, a technique for enabling the UE to combine signals received from multiple cells can be considered. Accordingly, there exists a need for developing a technique for enabling a UE at a cell boundary to combine and decode signals received from a plurality of cells.

SUMMARY OF THE INVENTION

Exemplary embodiments of the present invention address at least the above problems and/or disadvantages and to provide at least the advantages below. Accordingly, an aspect of the present invention is to provide a method and apparatus for enabling a UE located at a cell boundary to combine signals received from multiple cells in order to increase the reception performance of the UE.

According to one aspect of the present invention, in a method of transmitting downlink data to a UE located in a soft handover region in an OFDM system, first radio resources and a first scrambling sequence are allocated to the UE for use in a serving cell. At least one non-serving cell associated with the soft handover region is notified of the allocated first radio resources and first scrambling sequence. A first data signal is sent to the UE using the first radio resources and the first scrambling sequence and a first pilot signal for identification of the serving cell is sent to the UE using second radio resources and the first scrambling sequence by the serving cell. A second data signal identical to the first data signal is sent to the UE using the first radio resources and the first scrambling sequence and a second pilot signal for identification of the at least one non-serving cell is sent to the UE using the second radio resources and a second scrambling sequence by the at least one non-serving cell. A combining indication is sent to the UE by the serving cell. The combining indication indicates the at least one non-serving cell that sends the second data signal combinable with the first data signal.

According to another aspect of the present invention, in a cell transmitting apparatus for transmitting downlink data to a UE located in a soft handover region in an OFDM system, a scheduler allocates first radio resources and a first scrambling sequence to the UE for use in a serving cell, and notifies at least one non-serving cell associated with the soft handover region of the allocated first radio resources and first scrambling sequence. A serving cell transmitter in the serving cell sends to the UE a first data signal using the first radio resources and the first scrambling sequence and sends to the UE a first pilot signal for identification of the serving cell using second radio resources and the first scrambling sequence. At least one non-serving cell transmitter in the at least one non-serving cell sends to the UE a second data signal identical to the first data signal using the first radio resources and the first scrambling sequence and sends to the UE a second pilot signal for identification of the at least one non-serving cell using the second radio resources and a second scrambling sequence. Particularly, the serving cell transmitter sends a combining indication to the UE, and the combining indication indicates the at least one non-serving cell that sends the second data signal combinable with the first data signal.

According to a further aspect of the present invention, in a method of receiving downlink data in a UE located in a soft handover region in an OFDM system, a combining indication indicating at least one non-serving cell that sends a second data signal combinable with a first data signal sent from a serving cell associated with the soft handover region is received from the serving cell. A combined data signal including the first data signal and the second data signal sent from the serving cell and the at least one non-serving cell is received. Here, the first and second data signals are sent using first radio resources and a first scrambling sequence allocated for the serving cell. The combined data signal is channel-compensated using a first pilot signal received from the serving cell and a second pilot signal from the at least one non-serving cell.

According to still another aspect of the present invention, in an apparatus for receiving downlink data in a UE located in a soft handover region in an OFDM system, a combining indication receiver receives from a serving cell associated with the soft handover region a combining indication indicating at least one non-serving cell that sends a second data signal combinable with a first data signal sent from the serving cell. A reception path receives a combined data signal including the first data signal and the second data signal sent from the serving cell and the at least one non-serving cell, the first and second data signals using first radio resources and a first scrambling sequence allocated for the serving cell, and channel-compensates the combined data signal using a first pilot signal received from the serving cell and a second pilot signal from the at least one non-serving cell.

BRIEF DESCRIPTION OF THE DRAWINGS

The above and other objects, features and advantages of certain embodiments of the present invention will become more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Exemplary embodiments of the present invention will be described herein below with reference to the accompanying drawings. In the following, descriptions of well-known functions and constructions are omitted for clarity and conciseness.

The present invention pertains to transmission/reception between a Node B and a UE located at a multi-cell boundary in an OFDM cellular communication system.

The OFDM system designs a CP taking into account the delay characteristics of multi-path signal components inherent to a radio channel such that they are received within the length of the CP and can be recovered without mutual interference. Exemplary embodiments of the present invention utilize this feature of the OFDM system in a multi-cell environment.

Figure 1A:
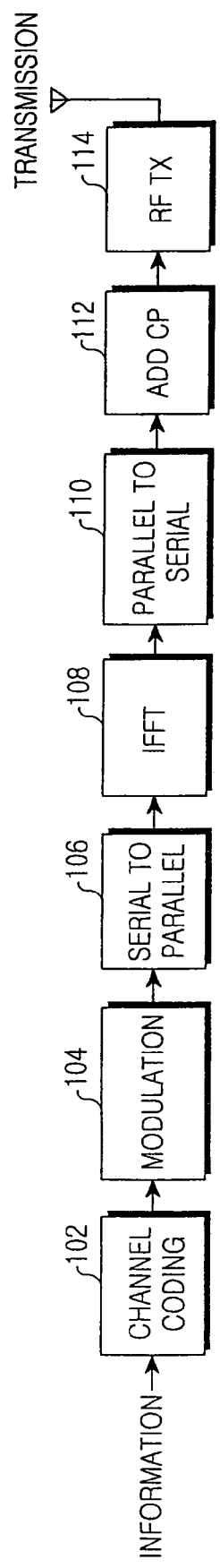
FIGS. 1A and 1B are block diagrams of a typical OFDM transmitter and receiver, respectively.
Figure 1B:
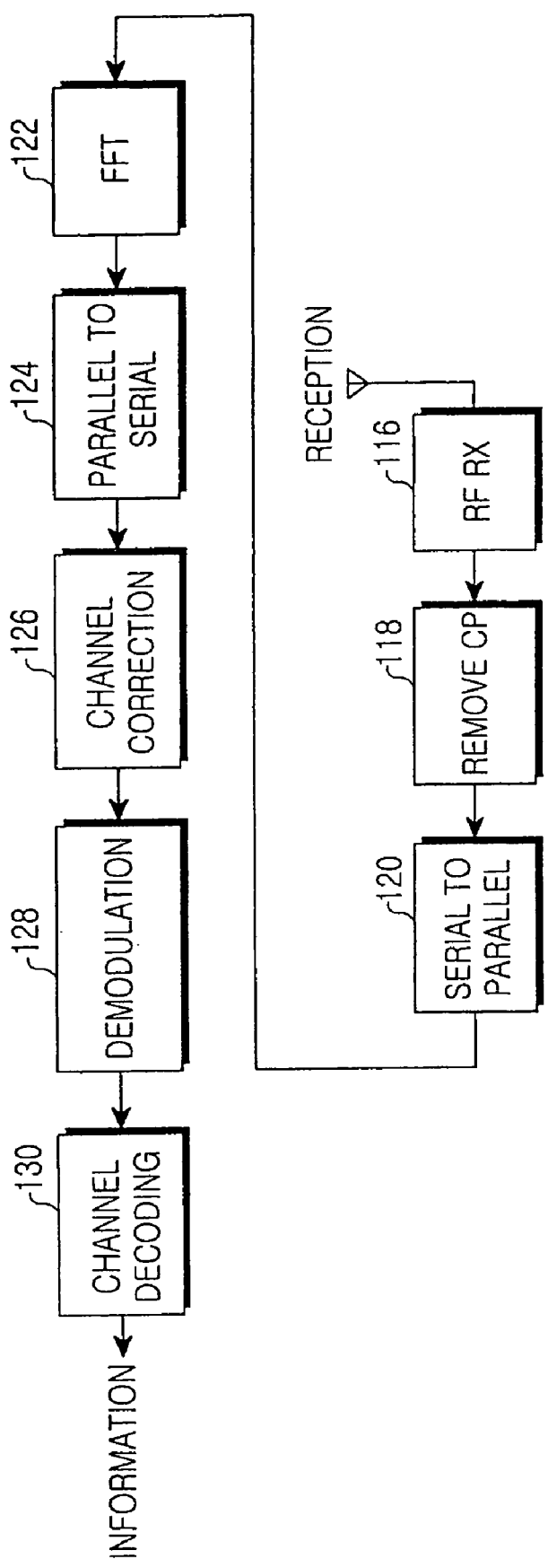
Figure 2A:
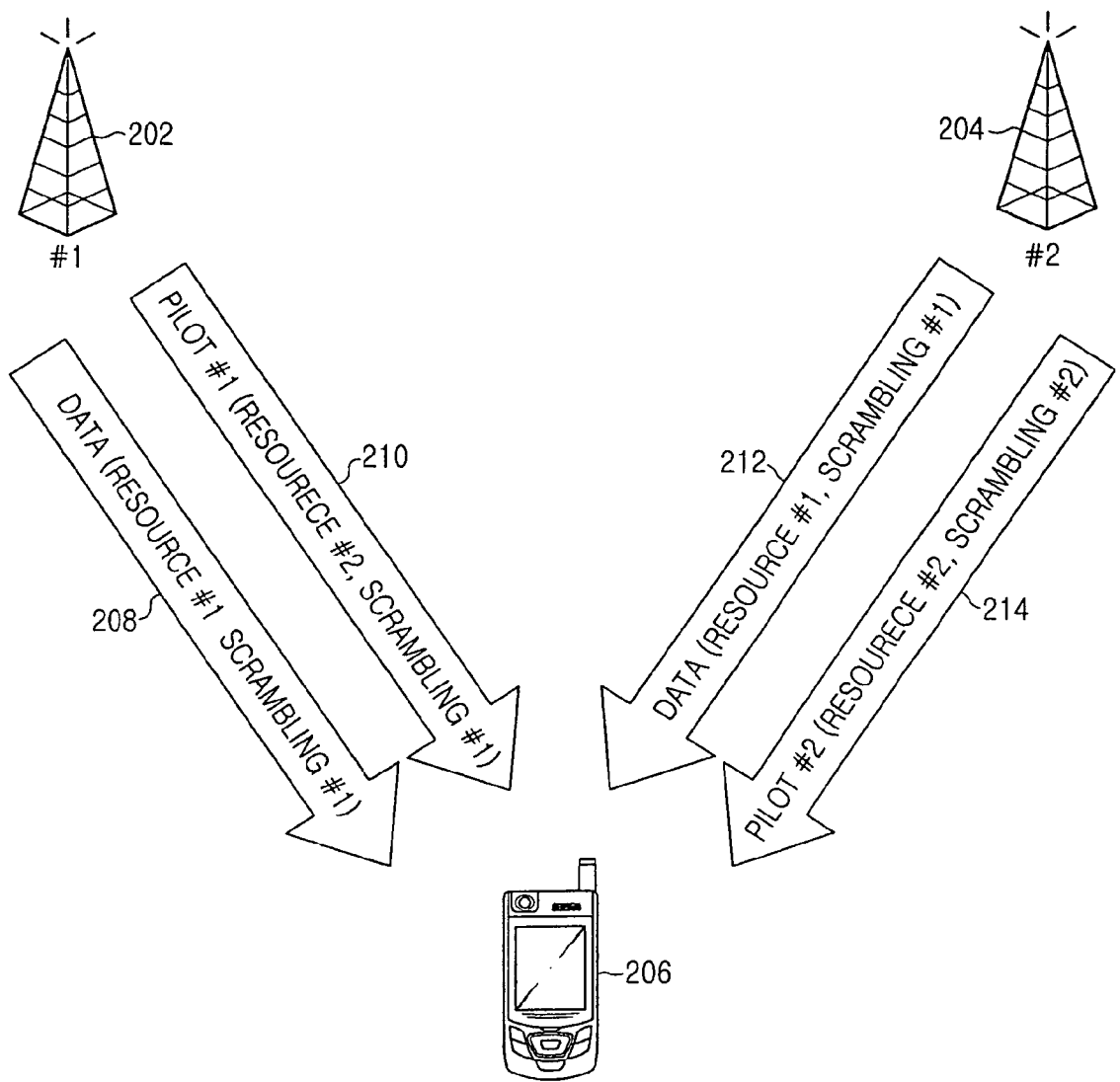
FIGS. 2A and 2B illustrate a combining concept and an exemplary radio resource allocation according to an exemplary embodiment of the present invention.
Figure 2B:
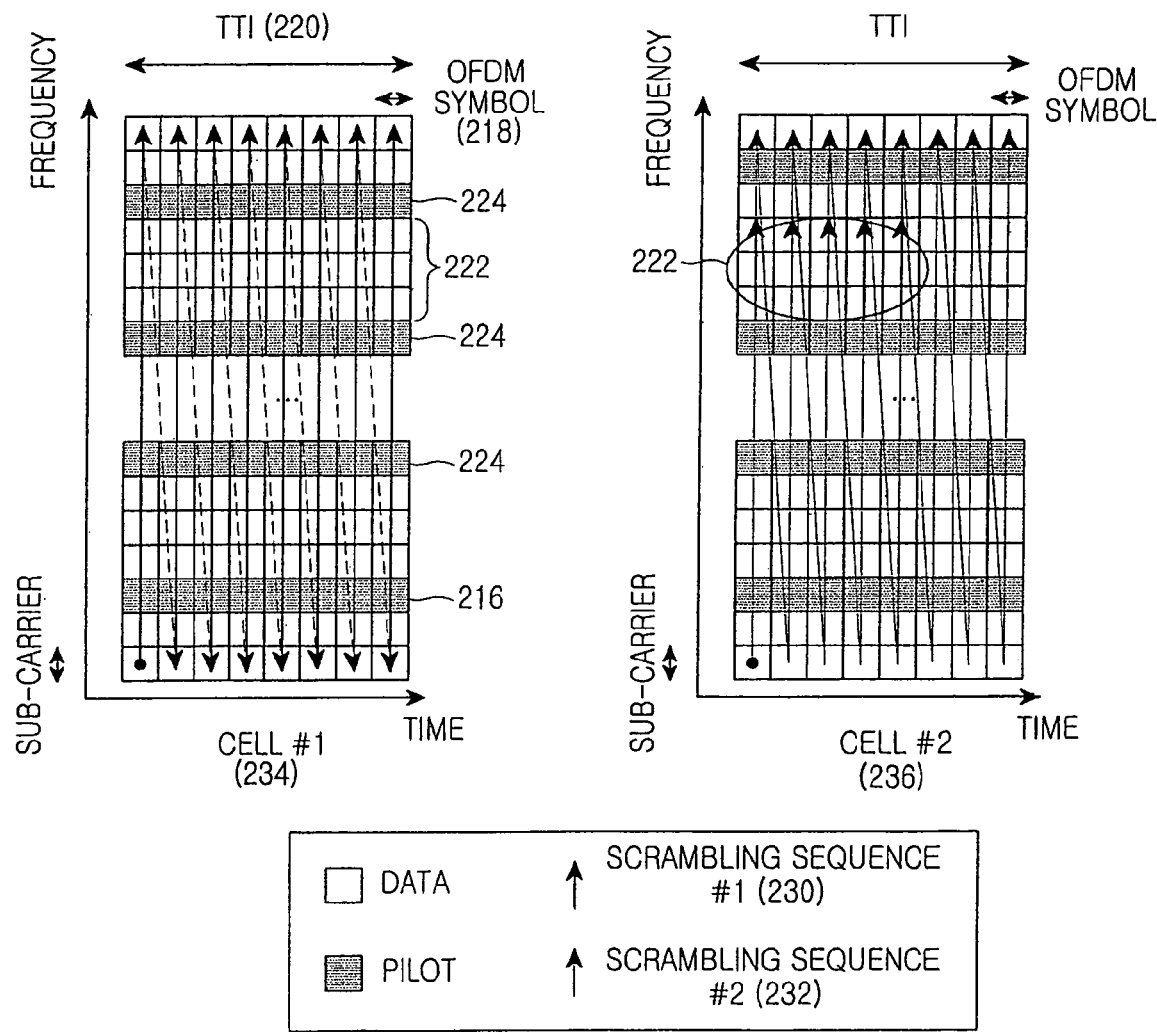

With reference to FIGS. 2A and 2B, the operation principle of an exemplary embodiment of the present invention will be described below. The term "cell" used herein is a hardware and software entity that directly manages radio resources within a coverage area.

Referring to FIG. 2A, a UE 206 is located in an overlap area between a first cell 202 (cell #1) and a second cell 204 (cell #2) and cell #1 is responsible for managing radio resources for the UE 206. Thus, cell #1 is a serving cell and cell #2 is a non-serving cell for the UE 206. While there are no specific limitations on cell #1 and cell #2 overlapped with each other, an entity for simultaneously managing the transmitters and receivers of cell #1 and cell #2, for example, a Node B (or a Base Station (BS)) exists, while not shown. Therefore, the transmitter/receiver of cell #1 can cooperate with or exchange information with that of cell #2.

The UE 206 accesses cell #1 and cell #2 by OFDM radio access technology, and cell #1 and cell #2 send data 208 and 212 to the UE 206 using the same radio resources, in other words time-frequency resources (resource #1) and the same scrambling sequence (scrambling sequence #1), so that the data 208 and 212 are naturally combined and received at the UE 206. For channel estimation and channel compensation, cell #1 and cell #2 scramble pilot signals 210 and 214 with different scrambling sequences (scrambling sequences #1 and #2), for cell identification, and send the scrambled pilot signals using the same radio resources (resource #2).

FIG. 2B illustrates an exemplary radio resource allocation from cell #1 and cell #2 illustrated in FIG. 2A.

Referring to FIG. 2B, cell #1 multiplies the data 208 by a first scrambling sequence 230 (scrambling sequence #1) allocated to cell #1 and sends the scrambled data to the UE 206 using radio resources 222 (resource #1) in order to reduce neighbor cell interference. Resource #1 allocated to the UE 206 are determined by cell #1 or a scheduler in the Node B. The bins of resource #1 may be successive as illustrated in FIG. 2B or non-continuous on the time-frequency domain.

In the OFDM system, radio resources are divided into two-dimensional time-frequency resource units. A basic radio resource unit in the frequency domain is an OFDM subcarrier 216 and a basic radio resource unit in the time domain is an OFDM symbol 218. The OFDM subcarrier, the OFDM symbol, and a basic time unit, in other words Transmission Time Interval (TTI) 220 depend on system design. Scrambling sequence #1 is preset for cell #1. In the illustrated case of FIG. 2B, scrambling sequence #1 is multiplied by the data 208 on a subcarrier-by-subcarrier basis in each OFDM symbol.

To enable the UE 206 to estimate a channel that the transmission signal from cell #1 experiences, cell #1 multiplies the pilot signal 210 by scrambling sequence #1. Radio resources 224 (resource #2) different from resource #1 are allocated to the pilot signal 210. Resource #2 allocated to the UE 206 for pilot transmission are preset during system design, or determined by cell #1 being the serving cell or the Node B scheduler. The allocation of the pilot signal 210 in the time-frequency domain illustrated in FIG. 2B is an exemplary application and the pilot allocation is appropriately performed during system design to increase channel estimation performance.

To enable data combining for the UE 206, cell #2 also sends the same data 212 as that of cell #1 to the UE 206. In this case, cell #2 uses the same radio resources 222, in other words resource #1 as those for the data 208 in cell #1. When each cell has a scheduler, a scheduler of cell #1 notifies a scheduler of cell #2 that resource #1 is in use for data transmission from cell #1. On the other hand, if a higher-layer entity for managing both cell #1 and cell #2, for example, the Node B has a scheduler, the Node B scheduler notifies cell #2 of the use of resource #1 by cell #1.

Cell #2 scrambles the data 212 with scrambling sequence #1 used for the data 208 other than scrambling sequence #2 allocated to cell #2 and sends the scrambled data to the UE 206 using resource #1. In this way, both cell #1 and cell #2 multiply the same data 208 and 212 by the same scrambling sequence and send the scrambled data using the same resources to the LIE 206. From the UE 206's point of view, it receives an already combined data signal without the need for distinguishing the data signals 208 and 212 from each other.

For channel estimation of the transmission signal from cell #2 in the UE 206, cell #2 scrambles the pilot signal 214 with scrambling sequence #2 specific to cell #2 and sends the scrambled signal preferably using the same radio resources, resource #2 used for those of the pilot signal 210 from cell #1. That is, the same radio resources 224 are used for the pilot signals 210 and 214 with no distinction between the cells and the UE 206 already has knowledge of resource #2 to which the pilot signals 210 and 214 are commonly allocated in every cell.

One thing to note is that scrambling sequence #2 multiplied by the pilot signal 214 from cell #2 is different from scrambling sequence #1 multiplied by the pilot signal 210 from cell #1. The pilot signals 210 and 214 are used for enabling the UEs within cell #1 and cell #2 to estimate the channel statuses of the cells. Therefore, the UEs identify the cells by scrambling sequences #1 and #2. Even though cell #1 and cell #2 allocate the same radio resources to the pilot signals 210 and 214, scrambling sequences #1 and #2 function to randomize interference between the neighbor cells.

In the above system, the UE 206 receives naturally combined data with no need for distinguishing the data 208 from the data 212. In other words, since cell #1 and cell #2 apply the same radio resources 222 and the same scrambling sequence 230 to the same data 208 and 212, the UE 206 receives the data as if it received multi-path signals. In the OFDM system, the multi-path signals are naturally combined without mutual interference. The thus-received data signal is to be channel-compensated in the following manner.

The UE 206 first extracts a signal from resource #2 and descrambles the extracted signal with scrambling sequence #1 specific to cell #1, thereby acquiring the pilot signal 210. The UE 206 then calculates a channel estimate of cell #1 using the pilot signal 210. The UE 206 descrambles the extracted signal with scrambling sequence #2 specific to cell #2, thereby acquiring the pilot signal 214. The UE 206 then calculates a channel estimate of cell #2 using the pilot signal 214.

The UE 206 achieves a final channel estimate of the received data signal by combining (in other words summing or averaging) the channel estimates of cell #1 and cell #2. After channel compensation or channel equalization for the data signal based on the final channel estimate, the UE 206 demodulates and decodes the data signal, thereby recovering the original information bit stream. The channel compensation is performed usually by zero forcing, Maximum Ratio Combining (MRC) or Minimum Mean Square Error (MMSE).

The system must notify the UE of the cells whose channel estimates the UE are to combine by signaling. The signaling can be physical layer (layer 1, L1) signaling or higher-layer (layer 2 or layer 3, L2 or L3) signaling. Each cell may notify the UE that its channel estimate is to be combined by signaling. In an exemplary embodiment, the serving cell signals to the UE.

Figure 3:
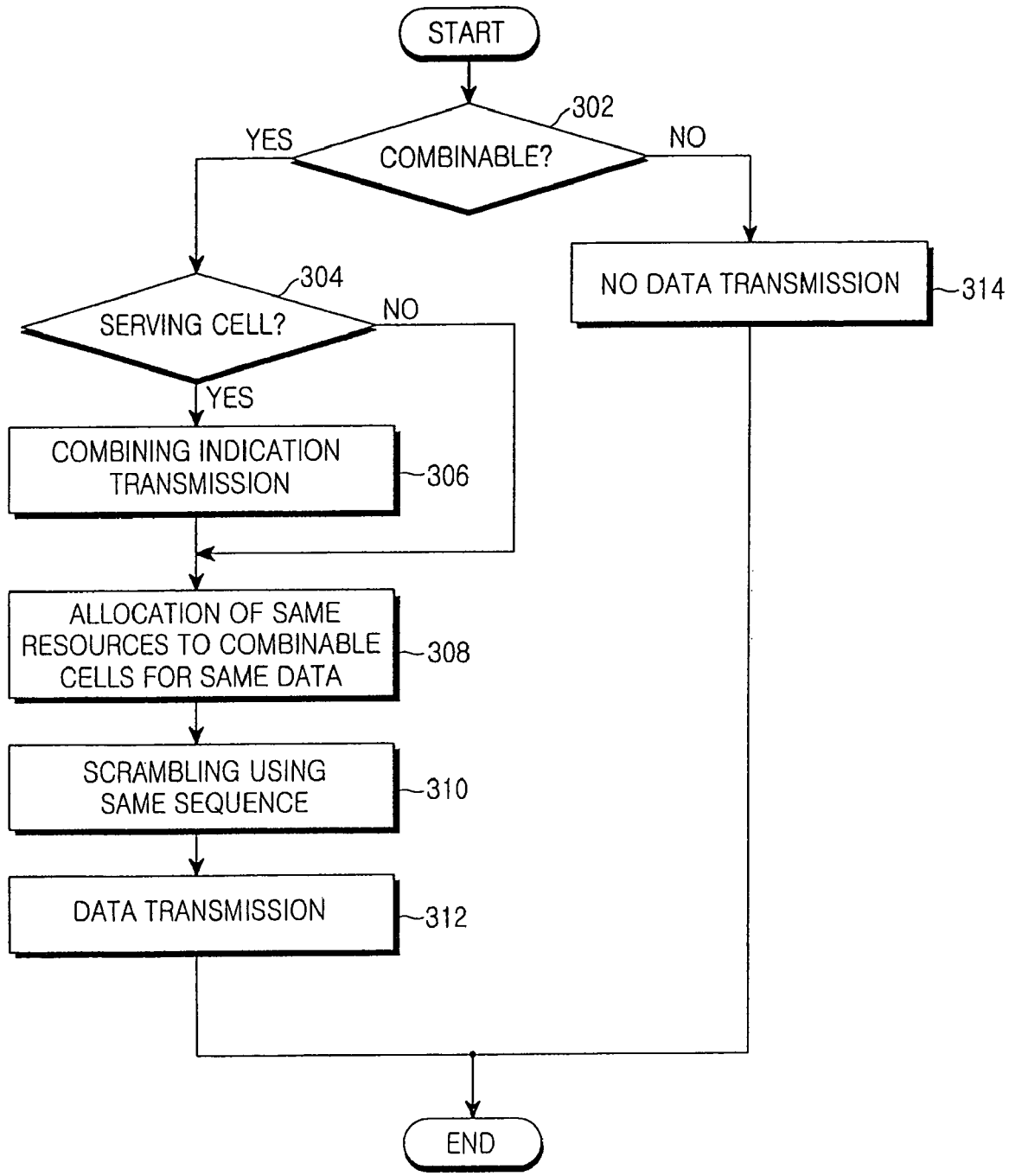
FIG. 3 is a flowchart illustrating a transmission operation in a Node B according to an exemplary embodiment of the present invention.

FIG. 3 is a flowchart illustrating a transmission operation in a Node B according to an exemplary embodiment of the present invention.

Referring to FIG. 3, when a UE is located at a cell boundary and capable of receiving data from multiple cells associated with the cell boundary, and the multiple cells can allocate the same radio resources for transmission of the same data, the Node B determines if the UE can combine signals received from the multiple cells in step 302. The multiple cells are referred to as combinable cells. The radio resources are those allocated by a serving cell or those available to the Node B for common allocation to the combinable cells. Only for the combinable cells, the Node B goes to step 304. In step 304, the Node B detects the serving cell among the combinable cells.

Upon detection of the serving cell, the Node B sets a combining indication and sends it to the UE using radio resources of the serving cell in step 306. The combining indication indicates the combinable cells, signaled by L1, L2 or L3 signaling. In this way, the UE can determine from the combining indication whether the other non-serving cells are combinable cells, without the need for receiving combining indications from all individual cells. For the non-serving cells, the Node B jumps from step 304 to step 308.

In step 308, the Node B allocates the same radio resources to the combinable cells for transmission of the same data. The radio resources are those the serving cell has already allocated for data transmission or are those that the combinable cells can commonly allocate. Information indicating the allocated radio resources is signaled between the combinable cells, or from the Node B to the combinable cells.

Data to be sent to the UE is scrambled with the same scrambling sequence in the combinable cells in step 310. The scrambling sequence is a sequence that the serving cell uses for the data or a sequence that the Node B allocates commonly to the multiple cells. Information indicating the scrambling sequence is shared among the combinable cells by inter-cell signaling or signaled to them by the Node B.

In step 312, the combinable cells send the scrambled data to the UE using the same radio resources. To demodulate and decode the data, the UE needs control information about a modulation scheme, a data block size, a channel coding method, and the radio resources used for the data transmission. Only the serving cell sends the control information to the UE, instead of the individual combinable cells. When needed, the combinable cells may send the control information individually to the UE, for ensuring high reception reliability. Resources with which to send the control information are preset or are notified to the UE by system information during call setup or channel reconfiguration between the UE and the Node B. The control information is also multiplied by the scrambling sequence of the serving cell, prior to transmission.

Meanwhile, in step 310, each of the combinable cells multiplies a pilot signal of a known pattern with its specific scrambling sequence and sends the scrambled pilot signal to the UE using the same radio resources allocated for pilot transmission. The pilot radio resources are preset or notified to the UE by system information during call setup or channel reconfiguration between the UE and the Node B.

For non-combinable cells, the Node B proceeds from step 302 to step 314 and does not send the data through the non-combinable cells in step 314.

Figure 4:
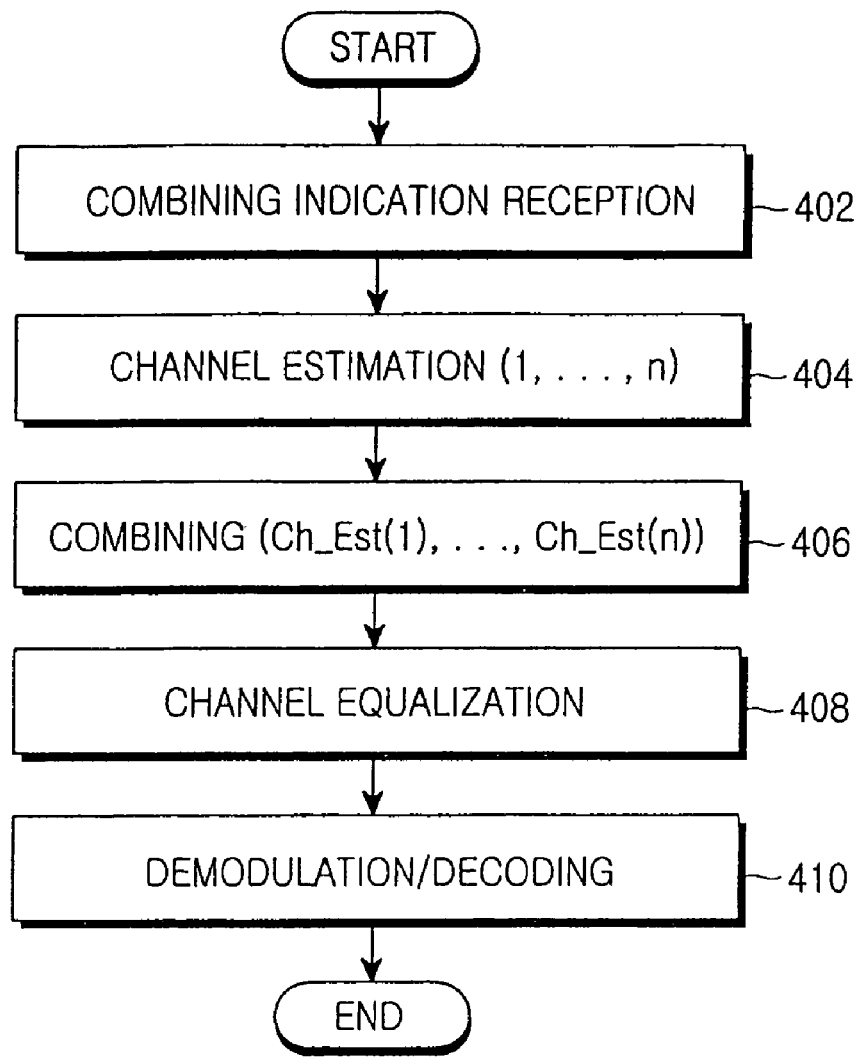
FIG. 4 is a flowchart illustrating a reception operation in a UE according to an exemplary embodiment of the present invention.

FIG. 4 is a flowchart illustrating a reception operation in the UE according to an exemplary embodiment of the present invention.

Referring to FIG. 4, the UE receives a combining indication from the serving cell and determines n combinable cells from the combining indication in step 402. The n combinable cells send the same data with the same scrambling sequence and the same radio resources to the UE. The data signals from the combinable cells are combined naturally without any interference and received at the UE in the OFDM system.

In step 404, the UE performs channel estimation using pilot signals from the combinable cells. Radio resources and scrambling sequences used for the pilot signals are preset or are notified to the UE by system information during call setup or channel reconfiguration between the UE and the Node B.

As a way of channel estimation, it is well known that time-domain or frequency-domain channel estimates of a signal to be compensated are calculated through interpolation using pilot symbols located at predetermined time-frequency positions.

The UE combines the resulting channel estimates for the n combinable cells, Ch_Est(1), . . . CH_Est(n) in step 406. An exemplary combining method is that the UE simply sums the channel estimates on a symbol-by-symbol basis. In step 408, the UE compensates for the channel distortion of a received data signal using the combined channel estimate. The channel compensation (or channel equalization) is carried out by zero forcing, MRC or MMSE. The UE finally acquires an information bit stream by demodulating the channel-compensated signal and decoding the demodulated data signal in step 410.

The operation principle of exemplary embodiments of the present invention, the Node B transmission operation, and the UE reception operation have been described above. Now a description will be made of a specific system operation, transmitter, and receiver based on the operation principle according to an exemplary embodiment of the present invention.

Exemplary Embodiment 1

Each cell uses a common pilot signal for channel estimation.

Figure 5:
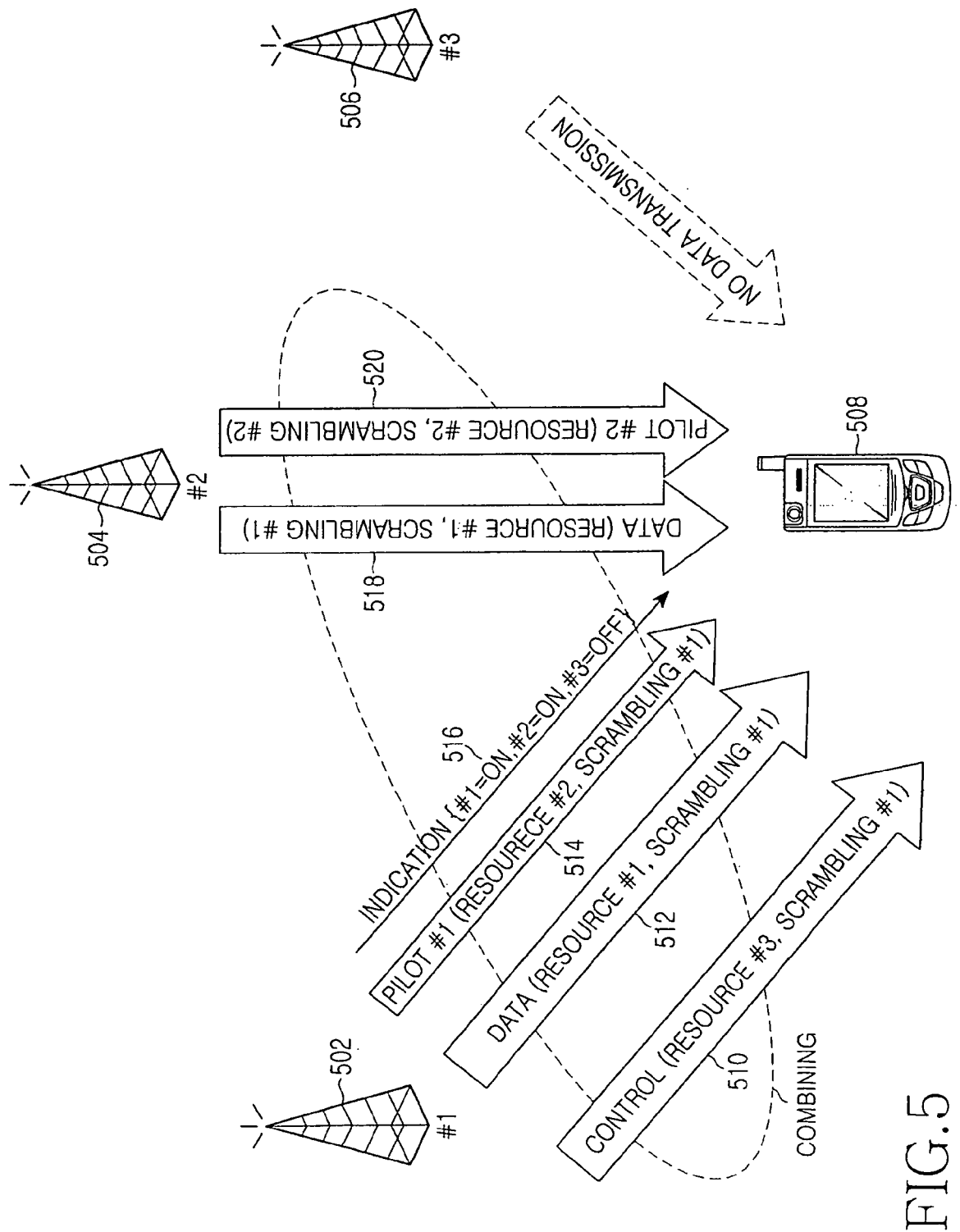
FIG. 5 illustrates a transmission/reception operation according to an exemplary embodiment of the present invention.

FIG. 5 illustrates a transmission/reception operation according to an exemplary embodiment of the present invention. Referring to FIG. 5, a UE 508 is located in an overlap area among a first cell 502 (cell #1), a second cell 504 (cell #2), and a third cell 508 (cell #3). Cell #1 is a serving cell and thus cell #2 and cell #3 are non-serving cells for the UE 508. To reduce interference among the cells, each cell uses a different randomizer configured to multiply a data signal by a different scrambling sequence specific to the cell.

Scrambling sequences #1, #2 and #3 are allocated to cell #1, cell #2, and cell #3, respectively. The scrambling sequences are notified to the UE 508 by system information during call setup or channel reconfiguration between the UE and the Node B. According to the exemplary embodiment of the present invention, the system operates almost in the aforedescribed manner. A description will be made of a transmitter and receiver using a common pilot in each cell.

Cell #1 multiplies data 512 with scrambling sequence #1 and sends the scrambled data using resource #1 to the UE 508. A scheduler in the serving cell, cell #1 or a scheduler in a Node B for managing cell #1, cell #2 and cell #3 allocates resource #1. Resource #1 is continuous or non-continuous in the time-frequency domain.

For estimation of a channel that the transmission signal from cell #1 experiences, a common pilot signal 514 is also multiplied by scrambling sequence #1 and sent to the UE 508 using resource #2 not overlapped with resource #1. Resource #2 is preset during system design or determined by the scheduler of the serving cell or the Node B scheduler, for common use in transmission of pilot signals 514 and 520 from cell #1, cell #2, and cell #3.

To demodulate and decode the data 512, the UE 508 needs control information 510 about a modulation scheme, a data block size, a channel coding method, and radio resources used for the data 512. Only the serving cell sends the control information 510 to the UE 508, instead of all the cells 502, 504 and 506. Resource #3 used to send the control information 510 is preset or notified to the UE 508 by system information during call setup or channel reconfiguration between the UE 508 and the Node B. The control information is also multiplied by scrambling sequence #1 of the serving cell 502 and sent using resource #3.

The serving cell 502 sends a combining indication 516 to the UE 508. The combining indication 516 includes identification information about combinable cells 502 and 504. It can be signaled by L1, L2 or L3 signaling. In this way, the UE 508 can determine from the combining indication 516 whether the non-serving cells are combinable cells, without the need for receiving combining indications from all the individual cells 502, 504 and 506. In the illustrated case of FIG. 5, the combining indication 516 is set to {#1=ON, #2=ON, #3=OFF} to indicate that the data signals from cell #1 and cell #2 are combinable and the data signal from cell #3 is not combinable.

For helping signal combining for the UE 508, cell #2 also sends the same data 518. It is assumed herein that resource #1 used in cell #1 is also available to cell #2. When a scheduler exists in each cell, the serving cell, cell #1 notifies cell #2 that resource #1 is in use for cell #1 by inter-cell signaling. On the other hand, if the Node B has a scheduler, the Node B scheduler notifies cell #2 that resource #1 is in use for cell #1.

Cell #2 scrambles the same data 518 with scrambling sequence #1 used for the data 512 other than scrambling sequence #2 allocated to cell #2 and sends the scrambled data to the UE 508 using resource #1. In this way, both cell #1 and cell #2 multiply the same data 512 and 518 by the same scrambling sequence #1 and send the scrambled data using the same radio resources #1 to the UE 508. From the UE 508's point of view, it receives a naturally combined data signal without the need for distinguishing the data signals transmitted from the cells 502, 504 and 506 from each other. To demodulate and decode the combined data signal, the UE 508 uses control information 510 received from the serving cell 502.

Cell #2 scrambles the common pilot signal 520 for channel estimation of the transmission signal from cell #2 with scrambling sequence #2 specific to cell #2, and sends the scrambled signal preferably using the same radio resources #2 used for transmission of the common pilot signal 514 from cell #1. That is, the same radio resource #2 is used for the common pilot signals 514 and 520 and the UE 508 already has knowledge of resource #2 to which the common pilot signals 514 and 520 are allocated in every cell.

One thing to note is that scrambling sequence #2 multiplied by the common pilot signal 520 from cell #2 is different from scrambling sequence #1 multiplied by the common pilot signal 514 from cell #1. The common pilot signals 514 and 520 are used for enabling the UEs within the cells 502 and 504 to estimate the channel statuses of the cells. Therefore, the UEs identify the cells by scrambling sequences #1 and #2. Even though cell #1 and cell #2 allocate the same radio resource #2 to the common pilot signals 514 and 520, scrambling sequences #1 and #2 function to randomize interference between neighbor cells.

Cell #3 cannot use resource #1. Because it does not send a data signal combinable with the data signals from cell #1 and cell #2, cell #3 does not send the same data to the UE 508.

In the above exemplary system, the UE 508 receives naturally combined data with no need for distinguishing the data 512 from the data 518. In other words, since cell #1 and cell #2 apply the same radio resource #1 and the same scrambling sequence #1 to the same data 512 and 518, the UE 508 receives the data as if it received multi-path signals. In the OFDM system, the multi-path signals are naturally combined without mutual interference. The thus-received data signal is to be channel-compensated in the following manner.

The UE 508 first extracts a signal from resource #2 and descrambles the extracted signal with scrambling sequence #1 specific to cell #1, thereby acquiring the pilot signal 514. The UE 508 then calculates a channel estimate of cell #1 using the pilot signal 514. As a way of channel estimation, it is well known that time-domain or frequency-domain channel estimates of a signal to be compensated are calculated through interpolation using pilot symbols located at predetermined time-frequency positions.

The UE 508 descrambles the extracted signal with scrambling sequence #2 specific to cell #2, thereby acquiring the pilot signal 520. The UE 508 then calculates a channel estimate of cell #2 using the pilot signal 520.

The UE 508 achieves a final channel estimate of the received data signal by combining (in other words summing or averaging) the channel estimates of cell #1 and cell #2. After channel compensation or channel equalization for the data signal based on the final channel estimate, the UE 508 demodulates and decodes the data signal, thereby recovering the original information bit stream. The channel compensation is performed usually by zero forcing, MRC, or MMSE.

Figure 6:
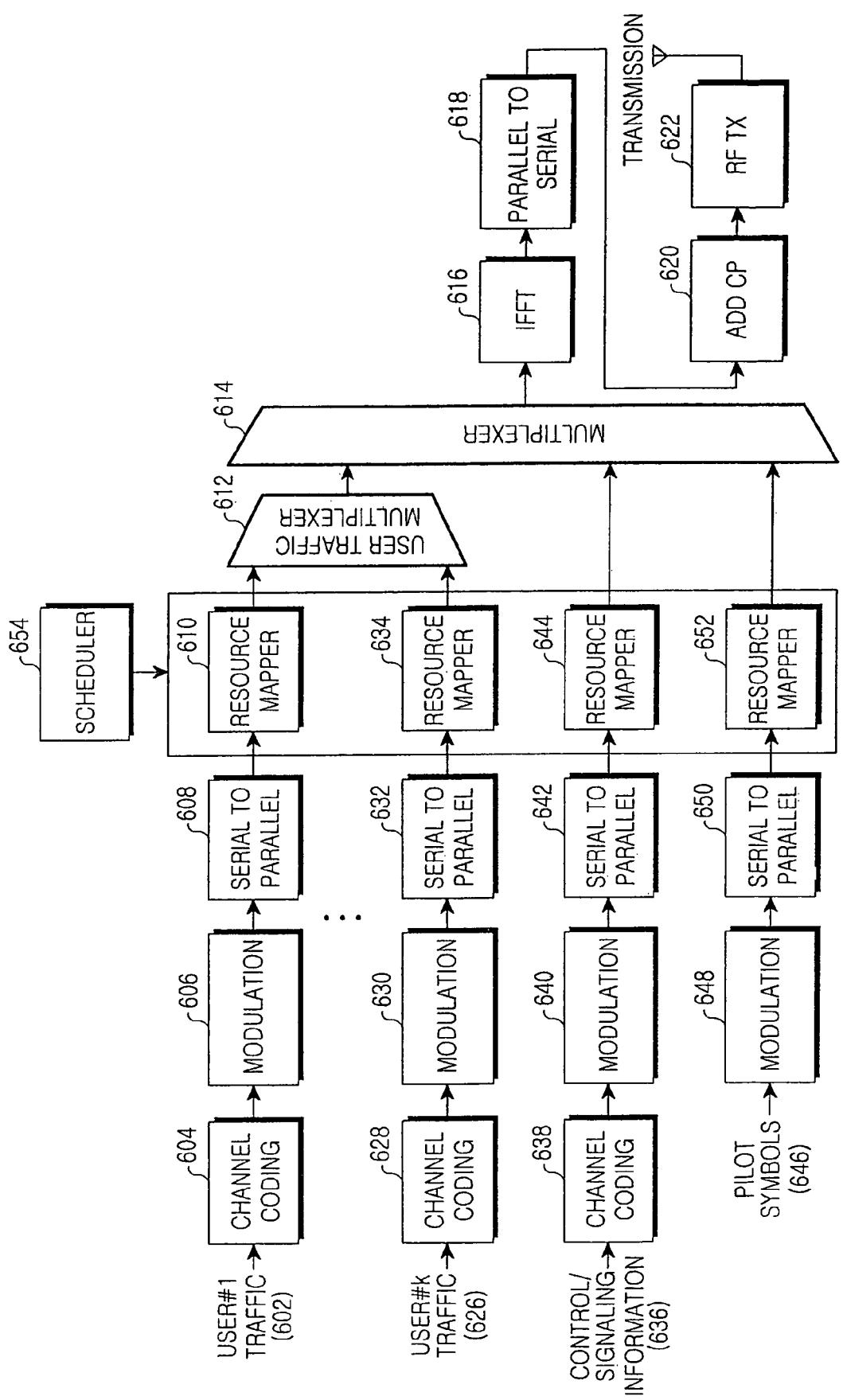
FIG. 6 is a block diagram of a Node B transmitter according to an exemplary embodiment of the present invention.

FIG. 6 is a block diagram of a Node B transmitter according to an exemplary embodiment of the present invention. A transmission path from a particular cell under the control of the Node B is illustrated. The particular cell is a serving cell or a non-serving cell to UEs within the coverage area of the cell.

Referring to FIG. 6, to send data 602 to 626 to k UEs at a cell boundary, User #1 to User #k, channel encoders 604 to 628 channel-encode the data 602 to 626. The channel encoders 604 to 628 may be convolutional encoders, turbo encoders or LDPC encoders. Modulators 606 to 630 modulate the coded streams by QPSK, 8PSK, 16QAM, or 64 QAM. While not shown, it is clearly to be understood to those skilled in the art that rate matchers can be interposed between the channel encoders 604 to 628 and the modulators 606 to 630, for repetition and puncturing.

S/P converters 608 to 632 parallelize the modulated signals, and Resource mappers 610 to 634 map the parallel signals to radio resources allocated by a scheduler 654. The scheduler 654 is located in a serving cell or in the Node B and allocates radio resources for the serving cell or a plurality of managed cells according to scheduling request information received from the UEs and their channel statuses. A user traffic multiplexer (MUX) 612 multiplexes the data signals received from the resource mappers 610 to 634, for transmission to the UEs within the cell.

Meanwhile, control/signaling information 636 required for demodulation and decoding of the data signals in the UEs is processed in a channel encoder 638, a modulator 640, and an S/P converter 642, and mapped to radio resources allocated by the scheduler 654 or predetermined radio resources in a resource mapper 644. The control information 636 may be delivered on one or more channels according to the characteristics of the control information 636.

Pilot symbols 646 used for channel estimation are processed in a modulator 648 and an S/P converter 650 and then mapped to radio resources allocated by the scheduler 654 or predetermined radio resources in a resource mapper 652. If the control information 636 or the pilot symbols 646 are allocated to the predetermined radio resources, information about the allocated radio resources is sent to the UEs during call setup or channel reconfiguration between the UEs and the Node B.

A MUX 614 multiplexes and scrambles the multiplexed data signal, the control signal received from the resource mapper 644, and the pilot signal received form the resource mapper 652. Specifically, for UEs for which the particular cell is a serving cell, data signals are multiplied by a scrambling sequence specific to the particular cell. On the other hand, for UEs for the particular cell is a non-serving combinable cell, data signals are multiplied by scrambling sequences specific to the serving cells of the UEs. Signals other than the data signals are multiplied by the scrambling sequence of the particular cell.

An IFFT processor 616 IFFT-processes the multiplexed signal. A P/S converter 618 serializes the IFFT signals and a CP adder 620 adds a CP to the serial signal. An RF transmitter 622 processes the CP-added signal by frequency upconversion, filtering and amplification, prior to transmission.

Meanwhile, the cell sets a combining indication and sends it to UEs for which the cell is a serving cell. The combining indication indicates all combinable cells, signaled by L1, L2 or L3 signaling. In this way, the UEs can determine from the combining indication whether neighbor cells are combinable cells, without the need for receiving combining indications from all accessible cells. If it is sent by L1 signaling, the combining indication is included in the control information 636. If it is sent by L2 or L3 signaling, the combining indication is included in the data 602 to 626.

Figure 7:
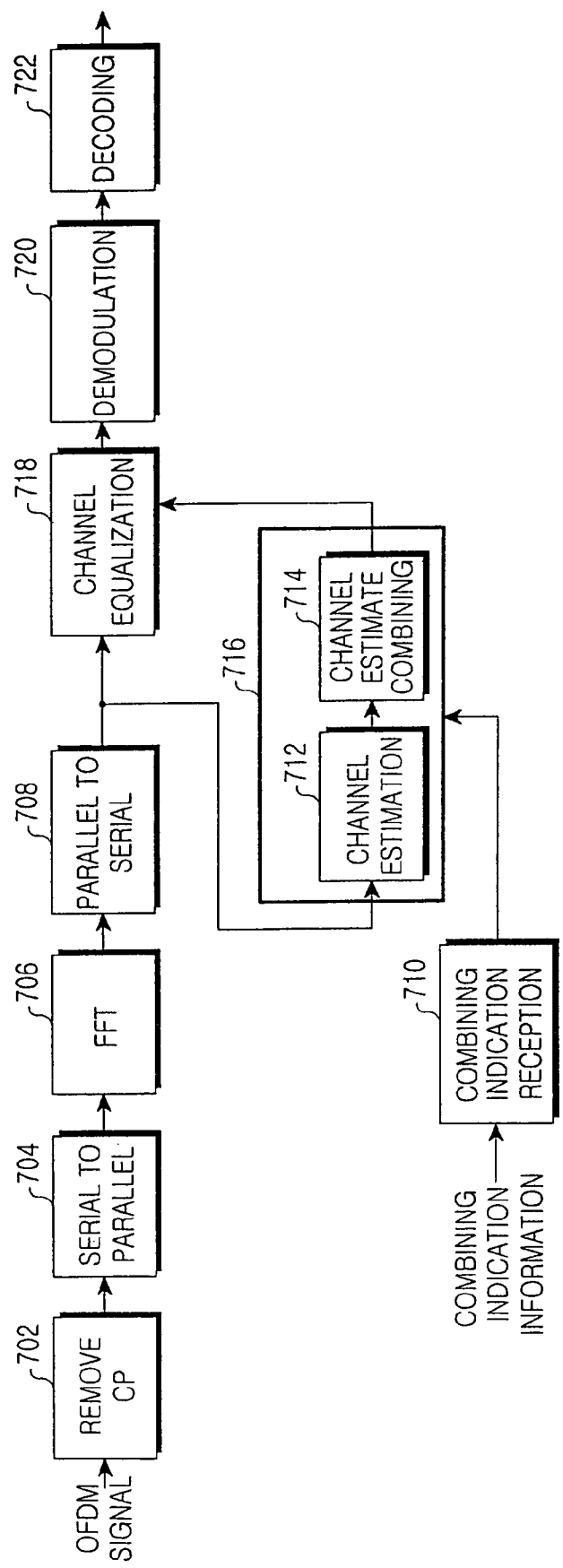
FIG. 7 is a block diagram of a UE receiver according to an exemplary embodiment of the present invention.

FIG. 7 is a block diagram of a UE receiver according to an exemplary embodiment of the present invention.

Referring to FIG. 7, an OFDM signal received through an RF receiver 116 is provided to a CP remover 702. The OFDM signal includes data signals and pilot signals scrambled with different scrambling sequence from combinable cells. The CP remover 702 eliminates a CP from the OFDM signal received from the RF receiver 116. An S/P converter 704 parallelizes the CP-free signal, an FFT processor 706 FFT-processes the parallel signals, and a P/S converter 708 serializes the FFT signals. Data and control information included in the serial signal are descrambled with the scrambling sequence of the serving cell of the UE and provided to a channel equalizer 718. Pilot signals included in the serial signal are provided to a channel estimation portion 716.

A combining indication receiver 710 determines combinable cells from a combining indication received from the service cell by L1, L2 or L3 signaling and tells the combinable cells to the channel estimation portion 716.

The channel estimation portion 716 includes a channel estimator 712 and a channel estimate combiner 714. The channel estimator 712 descrambles the pilot signals with the scrambling sequences of the combinable cells and acquires channel estimates for the combinable cells by channel estimation. The channel estimate combiner 714 combines the channel estimates, thus acquiring a final channel estimate.

The channel equalizer 718 functions as a channel compensator by channel-compensating the serial signal received form the P/S converter 708 using the final channel estimate. A demodulator 720 and a channel decoder 722 demodulates and decodes the channel-compensated signal using received control information, thereby obtaining an information bit stream.

Exemplary Embodiment 2

A common pilot signal is used for channel estimation in each cell, and a dedicated pilot signal is additionally used for channel estimation for combining.

Figure 8:
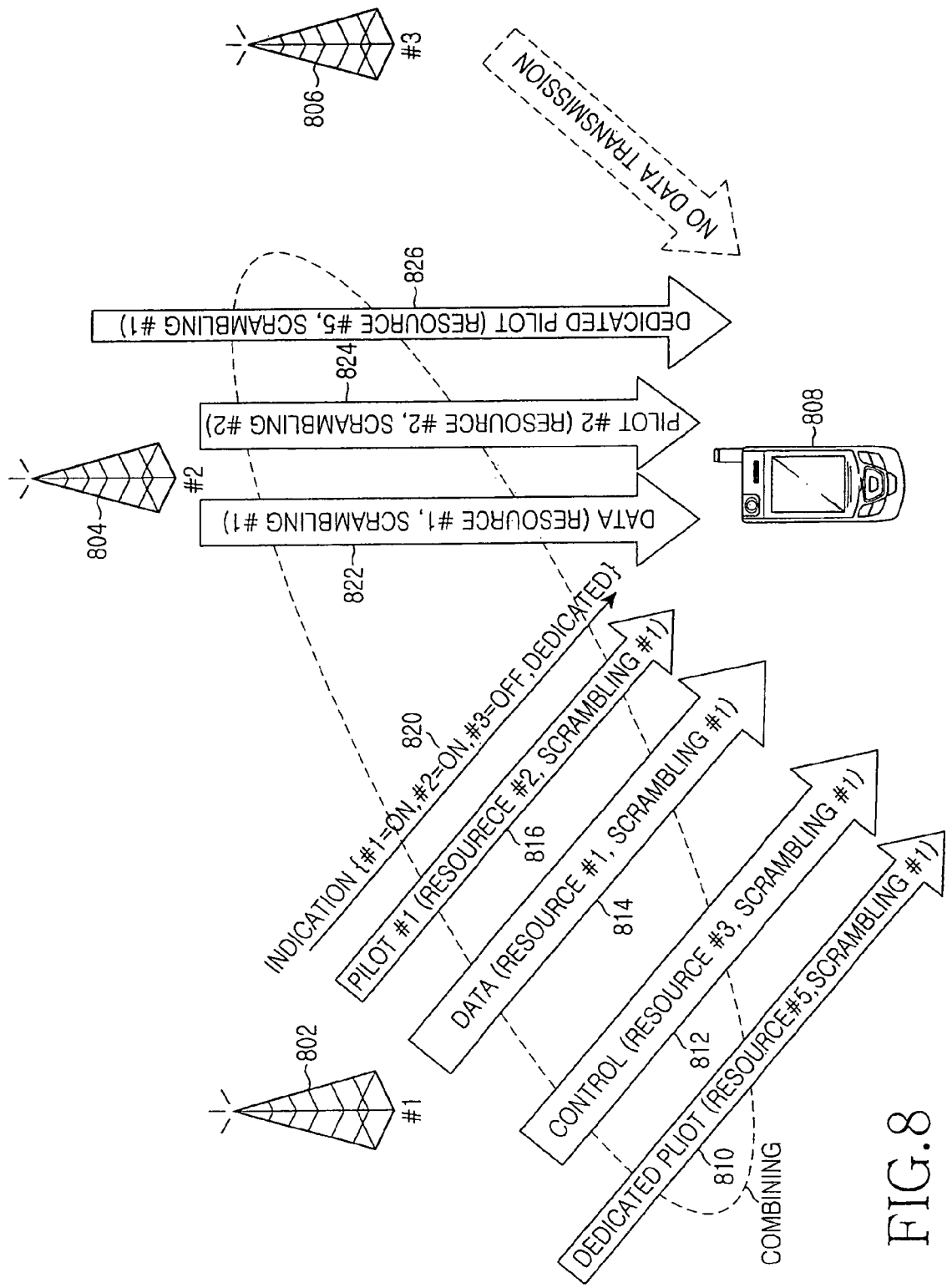
FIG. 8 illustrates a transmission/reception operation according to another exemplary embodiment of the present invention.

FIG. 8 illustrates a transmission/reception operation according to another exemplary embodiment of the present invention. Referring to FIG. 8, a UE 808 is located in an overlap area among a first cell 802 (cell #1), a second cell 804 (cell #2), and a third cell 806 (cell #3). Cell #1 is a serving cell and thus cell #2 and cell #3 are non-serving cells for the UE 808. To reduce interference among the cells 802, 804 and 806, each cell uses a different randomizer configured to multiply a data signal by a different scrambling sequence specific to the cell.

Scrambling sequences #1, #2 and #3 are allocated to cell #1, cell #2, and cell #3, respectively. The scrambling sequences are predetermined and notified to the UE 808 by system information during call setup or channel reconfiguration between the UE 808 and a Node B. According to the second exemplary embodiment of the present invention, the system operates almost in the same manner as in the first exemplary embodiment of the present invention, except that each cell uses common pilot signals 816 and 824, for helping channel estimation in UEs not located at a cell boundary and uses additional dedicated pilot signals 810 and 826 to facilitate combining and channel estimation in the UE 808 at the cell boundary.

Cell #1 multiplies data 814 with scrambling sequence #1 and sends the scrambled data using resource #1 to the UE 808. A scheduler in the serving cell, cell #1 or a scheduler in the Node B for managing cell #1, cell #2 and cell #3 allocates resource #1. Resource #1 is continuous or non-continuous in the time-frequency domain.

For estimation of a channel that the transmission signal from cell #1 experiences, a common pilot signal 816 is also multiplied by scrambling sequence #1 and sent to the UE 808 using resource #2 not overlapped with resource #1. Resource #2 is preset during system design or determined by the scheduler of the serving cell or the Node B scheduler.

Compared to the first exemplary embodiment, the second exemplary embodiment is characterized in that the common pilot signal 816 is used for channel estimation only in UEs which are not located at a cell boundary. For channel estimation in the UE 808 at the cell boundary, a dedicated pilot signal 810 is multiplied with scrambling sequence #1 and sent using resource #5 not overlapped with the radio resources allocated to data and control information destined for other users in cell #1. Resource #5 is preset during system design or determined by the scheduler of the serving cell (in other words cell #1) or the Node B scheduler. The scheduler also notifies cell #2 and cell #3 of resource #5 allocated to the dedicated pilot signal 810.

To demodulate and decode the data 814, the UE 808 needs control information 812 about a modulation scheme, a data block size, a channel coding method, and radio resources used for the data 814. Only the serving cell sends the control information 812 to the UE 808, instead of all the cells 802, 804 and 806. Resource #3 used to send the control information 812 is preset or notified to the UE 808 by system information during call setup or channel reconfiguration between the UE 808 and the Node B. The control information is also multiplied by scrambling sequence #1 of the serving cell 802 and sent using resource #3.

The serving cell 802 sends a combining indication 820 to the UE 808. The combining indication 820 includes identification information about combinable cells 802 and 804, and a dedicated pilot indicator indicating that channel estimation is possible for combining by the dedicated pilot signal 810. It can be signaled by L1, L2 or L3 signaling. In this way, the UE 808 can determine from the combining indication 820 whether the non-serving cells 804 and 806 are combinable cells, without the need for receiving combining indications from all the individual cells 802, 804 and 806. In the illustrated case of FIG. 8, the combining indication 820 is set to {#1=ON, #2=ON, #3=OFF, dedicated} to indicate that the data signals from cell #1 and cell #2 are combinable and the data signal from cell #3 is not combinable. "Dedicated" denotes a dedicated pilot indicator.

For helping signal combining for the UE 808, cell #2 also sends the same data 822. It is assumed herein that resource #1 used in cell #1 is also available to cell #2. When a scheduler exists in each cell, the serving cell, cell #1 notifies cell #2 that resource #1 is in use for transmission of the data 814 in cell #1 by inter-cell signaling. On the other hand, if the Node B has a scheduler, the Node B scheduler notifies cell #2 that resource #1 is in use in cell #1.

Cell #2 scrambles the data 822 with scrambling sequence #1 used for the data 814 other than scrambling sequence #2 allocated to cell #2 and sends the scrambled data to the UE 808 using resource #1. In this way, both cell #1 and cell #2 multiply the same data 814 and 822 by the same scrambling sequence #1 and send the scrambled data using the same radio resource #1 to the UE 808. The UE 808 receives a naturally combined data signal without the need for distinguishing the data signals transmitted from the cells from each other. To demodulate and decode the combined data signal, the UE 808 uses control information 812 received from the serving cell 802.

cell #2 scrambles the common pilot signal 824 for channel estimation of the transmission signal from cell #2 with scrambling sequence #2 specific to cell #2, and sends the scrambled signal preferably using the same radio resource #2 used for transmission of the common pilot signal 816 from cell #1. That is, the same radio resource #2 is used for the common pilot signals 816 and 824 and the UE 808 already has knowledge of resource #2 to which the common pilot signals 816 and 824 are allocated in every cell.

One thing to note is that scrambling sequence #2 multiplied by the common pilot signal 824 from cell #2 is different from scrambling sequence #1 multiplied by the common pilot signal 816 from cell #1. The common pilot signals 816 and 824 are used for enabling the UEs within the cells 802 and 804 to estimate the channel statuses of the cells. Therefore, the UEs identify the cells by scrambling sequences #1 and #2. Even though cell #1 and cell #2 allocate the same radio resource #2 to the common pilot signals 816 and 824, scrambling sequences #1 and #2 function to randomize interference between neighbor cells.

Compared to the first exemplary embodiment, the common pilot signal is used for channel estimation in UEs located in areas other than the cell boundary. To assist the UE 808 at the cell boundary with signal combining and channel estimation, cell #2 sends the dedicated pilot signal 826 with scrambling sequence #1 and resource #5. The scheduler of the serving cell 802 or the Node B scheduler informs Cell #2 that the serving cell 802 uses the dedicated pilot signal 810 and resource #5 is allocated for the transmission of the dedicated pilot signal 810.

Cell #3 cannot use resource #1. Because it does not send a data signal combinable with the data signals from cell #1 and cell #2, cell #3 does not send the same data to the UE 508.

In the above system, the UE 808 receives naturally combined data with no need for distinguishing the data 814 from the data 822. In other words, since cell #1 and cell #2 apply the same radio resource #1 and the same scrambling sequence #1 to the same data 814 and 812, the UE 808 receives the data as if it received multi-path signals. In the OFDM system, the multi-path signals are naturally combined without mutual interference.

Both cell #1 and cell #2 send the dedicated pilot signals 810 and 826 for use in channel estimation of the combined data signal using scrambling sequence #1 and resource #5. The dedicated pilot signals 810 and 826 are also naturally combined and received at the UE 808. Unlike the first exemplary embodiment, the process of calculating channel estimates for cell #1 and cell #2 and then combining the channel estimates is required in the second embodiment.

The UE 808 first extracts a signal from resource #5 with the dedicated pilot signals 810 and 826 and descrambles the extracted signal with scrambling sequence #1 specific to cell #1, thereby acquiring a combination of the pilot signals 810 and 826. The UE 808 then calculates channel estimates for the combined data signal, and channel-compensates (or channel-equalizes), demodulates and decodes the combined data signal.

A Node B transmitter and a UE receiver for operating according to the second exemplary embodiment have the configurations illustrated in FIGS. 6 and 7. In FIG. 6, the pilot mapper 652 maps a received pilot signal to common pilot radio resources and dedicated pilot radio resources. In FIG. 7, if the UE is located in an overlap area, the channel estimation portion 716 acquires a combination of dedicated pilot signals from combinable cells indicated by a combining indication, calculates a channel estimate for a combined data signal using the combined dedicated pilot signal, and provides the channel estimate to the channel equalizer 718.

Exemplary Embodiment 3

A common pilot signal is used for channel estimation in each cell as in the first exemplary embodiment of the present invention, and an additional data combining is carried out.

Figure 9:
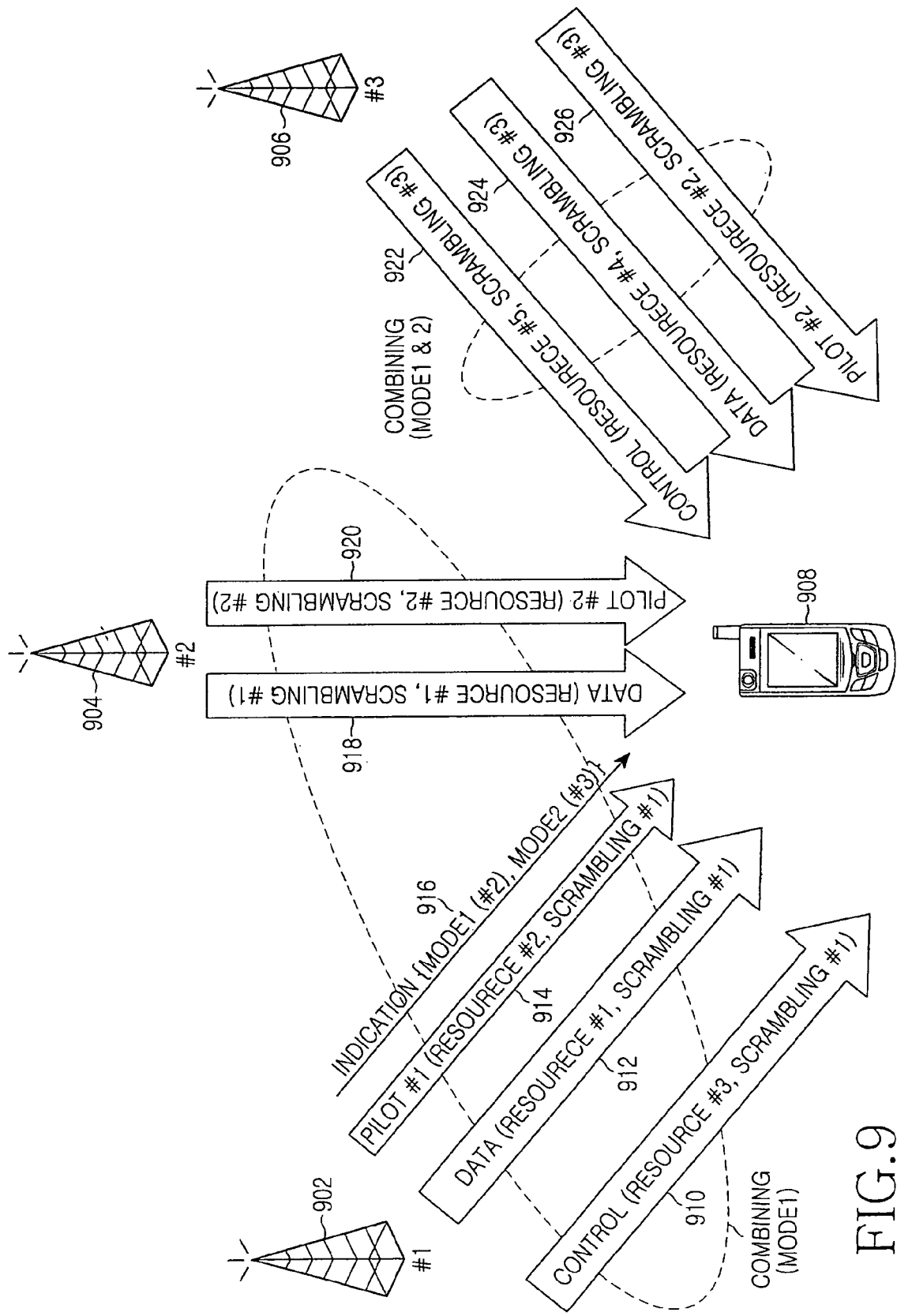
FIG. 9 illustrates a transmission/reception operation according to a third exemplary embodiment of the present invention.

FIG. 9 illustrates a transmission/reception operation according to a third exemplary embodiment of the present invention. Referring to FIG. 9, a UE 908 is located in an overlap area among a first cell 902 (cell #1), a second cell 904 (cell #2), and a third cell 906 (cell #3). Cell #1 is a serving cell and thus cell #2 and cell #3 are non-serving cells for the UE 908. To reduce interference among the cells 902, 904 and 906, each cell uses a different randomizer configured to multiply a data signal by a different scrambling sequence specific to the cell.

Scrambling sequences #1, #2 and #3 are allocated to cell #1, cell #2, and cell #3, respectively. The scrambling sequences are predetermined and notified to the UE 908 by system information during call setup or channel reconfiguration between the UE 908 and a Node B. According to the third exemplary embodiment of the present invention, the system operates almost in the same manner as in the first exemplary embodiment of the present invention, except that an additional data combining is required.

Cell #1 multiplies data 912 with scrambling sequence #1 and sends the scrambled data using resource #1 to the UE 908. For estimation of a channel that the transmission signal from cell #1 experiences, a common pilot signal 914 is also multiplied by scrambling sequence #1 and sent to the UE 908 using resource #2 not overlapped with resource #1. To demodulate and decode the data 912, the UE 908 needs control information 910 about a modulation scheme, a data block size, a channel coding method, and radio resources used for the data 912. The control information 910 is multiplied by scrambling sequence #1 of the serving cell 902 and sent using resource #3.

In the illustrated case of FIG. 9, a data signal 918 from cell #2 is combinable with the data signal 912 from cell #1 in a first combining mode, and a data signal 924 from cell #3 is combinable with the data signal 912 form cell #1 in a second combining mode. The first combining mode refers to natural combining of the data signals 912 and 918 using the same scrambling sequence #1, whereas the second combining mode refers to combining of the data signals 912 and 924 using different scrambling sequences #1 and #3 after distinguishing the data signals 912 and 924 from each other in the UE 908.

Cell #2 sends the data 918 and a common pilot signal 920 to the UE 908 in the same manner as in the first exemplary embodiment of the present invention, which will not be described further. Since cell #2 allocates the same resource #1 as that of the data signal 912 in cell #1, the data signal 918 from cell #2 is combinable with the data signal 912 from cell #1 in the first combining mode. That is, both cells #1 and #2 multiply the same data 912 and 918 by the same scrambling sequence #1 and send the scrambled data using the same radio resource #1 to the UE 908. Thus, the UE 908 receives a naturally combined data signal without the need for distinguishing the data signals 912 and 918 transmitted from the cells from each other. To demodulate and decode the combined data signal, the UE 908 uses control information 910 received from the serving cell 902.

Cell #3 cannot use resource #1 allocated to the data 912 from cell #1. Therefore, cell #3 sends the same data 924 using scrambling sequence #3 specific to cell #3 and resource #4 available to cell #3. For channel estimation of the transmission signal, cell #3 sends a pilot signal 926 using scrambling sequence #3 and resource #2.

To enable the UE 908 to demodulate and decode the data signal 924, cell #3 sends control information 922 indicating that resource #4 is used for the data signal 924, using resource #5 and scrambling sequence #3. Resource #5 is predetermined or notified to the UE 908 during call setup or channel reconfiguration between the UE 908 and the Node B. The UE 908 combines the data signal 924 from cell #3 with the combined data signal from the other cells.

The UE 908 performs channel compensation and data combining on the data signals received form the cells 902, 904 and 906 as follows.

The UE 908 receives a combining indication 916 form the serving cell 902. The combining indication 916 indicates that the data signal 918 from cell #2 is combinable with the data signal 912 form cell #1 in the first combining mode, and the data signal 924 from cell #3 is combinable with the data signal 912 form cell #1 in the second combining mode (mode 1(#2), mode 2(#3)). Because the data signals 912 and 918 are sent using resource #1 and scrambling sequence #1, they are naturally combined and received at the UE 908 (the first combining mode). The UE 908 combines channel estimates calculated from the pilot signals 914 and 920 received from cell #1 and cell #2 and compensates the combined data signal using the combined channel estimate.

Specifically, the UE 908 first extracts a signal from resource #2 with the common pilots and descrambles the extracted signal with scrambling sequence #1 specific to cell #1, thereby acquiring the pilot signal 914. The UE 908 then calculates a channel estimate for cell #1 using the pilot signal 914. The UE 908 also descrambles the extracted signal with scrambling sequence #2 specific to cell #2, thereby acquiring the pilot signal 920. The UE 908 then calculates a channel estimate for cell #2 using the pilot signal 920. The UE 908 calculates a final channel estimate for the combined data signal from cell #1 and cell #2 by combining the channel estimates. The combined data signal is compensated using the final channel estimate. The channel-compensated signal is called a first channel-compensated signal.

The UE 908 combines the data signal 924 received form cell #3 with the combined data signal in the second combining mode. That is, the UE 908 determined from the control information 922 received from cell #3 that the data signal 924 is allocated to resource #4, and acquires the data signal 924 using resource #4 and scrambling sequence #3. The UE 908 extracts a signal from resource #2 and descrambles the extracted signal with scrambling sequence #3 specific to cell #3, thereby acquiring the pilot signal 926. The UE 908 then calculates a channel estimate for cell #3 using the pilot signal 926. The data signal 924 is compensated using the channel estimate. The channel-compensated signal is a second channel-compensated signal.

The UE 908 combines the first and second channel-compensated signals (the second combining mode), thus completing combining of the signals received from cell #1, cell #2 and cell #3. The UE 908 acquires a final information bit stream by demodulating and decoding the combined signal.

A Node B transmitter and a UE receiver for operating according to the third exemplary embodiment have the configurations illustrated in FIGS. 6 and 7. One thing to note is that the UE is provided with a reception path for generating the first channel-compensated signal and a reception path for generating the second channel-compensated signal. The reception paths are defined by the components 702 to 718 illustrated in FIG. 7. As described above, the first and second channel-compensated signals are generated and combined in a separately procured combiner (not shown). The resulting combined data signal is recovered to an information bit stream through the demodulator 720 and the decoder 722.

As described above, the present invention provides a downlink data transmitting/receiving method and apparatus for a UE at a cell boundary in an OFDM cellular system. The present invention offers the same diversity effect as with reception of multi-path signals to the UE. Therefore, the reception performance of the LTE is improved.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of transmitting downlink data to a user equipment (UE) located in a handover region in a communication system, the method comprising:

allocating first radio resources and a first scrambling sequence to the UE for use in a serving cell;

notifying at least one non-serving cell associated with the handover region of the allocated first radio resources and first scrambling sequence;

sending a first data signal using the first radio resources and the first scrambling sequence to the UE and sending a first pilot signal for identification of the serving cell using second radio resources and the first scrambling sequence to the UE by the serving cell;

sending a second data signal identical to the first data signal using the first radio resources and the first scrambling sequence to the UE and sending a second pilot signal for identification of the at least one non-serving cell using the second radio resources and a second scrambling sequence to the UE by the at least one non-serving cell; and sending a combining indication to the UE by the serving cell, the combining indication indicating the at least one non-serving cell that sends the second data signal combinable with the first data signal.

2. The method of claim 1, further comprising:

sending control information about the first and second data signals using radio resources and the first scrambling sequence to the UE by the serving cell.

3. The method of claim 2, wherein the control information comprises at least one of a modulation scheme, a data block size, a channel encoding scheme, and radio resources used for the first and second data signals.

4. The method of claim 1, wherein sending a combining indication to the UE comprises sending the combining indication to the UE by at least one of physical layer signaling and higher-layer signaling by the serving cell.

5. The method of claim 1, wherein the first and second pilot signals are used for channel compensation of the first and second data signals, respectively.

6. The method of claim 1, further comprising:
sending to the UE dedicated pilot signals for channel compensation of the first and second data signals using radio resources and the first scrambling sequence by the serving cell and the at least one non-serving cell.

7. The method of claim 6, wherein the combining indication information further comprises an indicator indicating that the serving cell and the at least one non-serving cell send the dedicated pilot signals.

8. The method of claim 5, further comprising:
sending to the UE a third data signal identical to the first data signal using third radio resources and a third scrambling sequence and a third pilot signal for channel compensation of the third data signal using the second radio resources and the third scrambling sequence by a non-serving cell to which the first radio resources are not available.

9. The method of claim 8, wherein the combining indication separately indicates the at least one non-serving cell that sends the second data signal using the first radio resources and the non-serving cell that sends the third data signal using the third radio resources.

10. The method of claim 1, wherein the allocation and notification steps are performed by at least one of a scheduler in the serving cell and a scheduler in a Node B for managing the serving cell and the at least one non-serving cell.

11. A cell transmitting apparatus for transmitting downlink data to a user equipment (UE) located in a handover region in a communication system, comprising:
a scheduler for allocating first radio resources and a first scrambling sequence to the UE for use in a serving cell, and notifying at least one non-serving cell associated with the handover region of the allocated first radio resources and first scrambling sequence;
a serving cell transmitter in the serving cell, for sending to the UE a first data signal using the first radio resources and the first scrambling sequence and sending to the UE a first pilot signal for identification of the serving cell using second radio resources and the first scrambling sequence; and
at least one non-serving cell transmitter in the at least one non-serving cell, for sending to the UE a second data signal identical to the first data signal using the first radio resources and the first scrambling sequence and sending to the UE a second pilot signal for identification of the at least one non-serving cell using the second radio resources and a second scrambling sequence,
wherein the serving cell transmitter sends a combining indication to the UE, the combining indication indicating the at least one non-serving cell that sends the second data signal combinable with the first data signal.

12. The cell transmitting apparatus of claim 11, wherein the serving cell transmitter sends to the UE control information about the first and second data signals using radio resources and the first scrambling sequence.

13. The cell transmitting apparatus of claim 12, wherein the control information comprises at least one of a modulation scheme, a data block size, a channel encoding scheme, and radio resources used for the first and second data signals.

14. The cell transmitting apparatus of claim 11, wherein the serving cell transmitter sends the combining indication to the UE by at least one of physical layer signaling and higher-layer signaling.

15. The cell transmitting apparatus of claim 11, wherein the first and second pilot signals are used for channel compensation of the first and second data signals, respectively.

16. The cell transmitting apparatus of claim 11, wherein the serving cell transmitter and the at least one non-serving cell transmitter send to the UE dedicated pilot signals for channel compensation of the first and second data signals using radio resources and the first scrambling sequence.

17. The cell transmitting apparatus of claim 16, wherein the combining indication information further comprises an indicator indicating that the serving cell and the at least one non-serving cell sends the dedicated pilot signals.

18. The cell transmitting apparatus of claim 15, wherein a non-serving cell transmitter in a non-serving cell to which the first radio resources are not available sends to the UE a third data signal identical to the first data signal using third radio resources and a third scrambling sequence and a third pilot signal for channel compensation of the third data signal using the second radio resources and the third scrambling sequence.

19. The cell transmitting apparatus of claim 18, wherein the combining indication separately indicates the at least one non-serving cell that sends the second data signal using the first radio resources and the non-serving cell that sends the third data signal using the third radio resources.

20. The cell transmitting apparatus of claim 11, wherein the scheduler is provided in at least one of the serving cell or in a Node B for managing the serving cell and the at least one non-serving cell.

21. A method of receiving downlink data in a user equipment (UE) located in a handover region in a communication system, the method comprising:
receiving from a serving cell associated with the handover region a combining indication indicating at least one non-serving cell that sends a second data signal combinable with a first data signal sent from the serving cell;
receiving a combined data signal including the first data signal and the second data signal sent from the serving cell and the at least one non-serving cell with a first pilot signal and a second pilot signal, the first and second data signals using first radio resources and a first scrambling sequence allocated for the serving cell; and
channel-compensating the combined data signal using the first pilot signal received from the serving cell using a second radio resources and the first scrambling sequence and the second pilot signal from the at least one non-serving cell using the second radio resources and a second scrambling sequence.

22. The method of claim 21, further comprising:
receiving from the serving cell control information about the first and second data signals using radio resources and the first scrambling sequence.

23. The method of claim 22, wherein the control information comprises at least one of a modulation scheme, a data block size, a channel encoding scheme, and radio resources used for the first and second data signals.

24. The method of claim 21, wherein receiving from a serving cell associated with the handover region a combining indication comprises receiving the combining indication from the serving cell by at least one of physical layer signaling or higher-layer signaling.

25. The method of claim 21, further comprising:
sending the first pilot signal using second radio resources and the first scrambling code by the serving cell;
sending the second pilot signal using the second radio resources and a second scrambling code by the at least one non-serving cell; and
wherein channel compensating the combined data signal comprises:
calculating a first channel estimate using the first pilot signal;
calculating a second channel estimate using the second pilot signal;
combining the first and second channel estimates; and
channel-compensating the combined data signal using the combined channel estimate.

26. The method of claim 21, further comprising:
sending the first and second pilot signals using radio resources and the first scrambling code, for channel compensation of the first and second data signals by the serving cell and the at least one non-serving cell; and
wherein channel compensating the combined data signal comprises:
receiving a combined pilot signal including the first and second pilot signals;
calculating a channel estimate using the combined pilot signal; and
channel-compensating the combined data signal using the channel estimate.

27. The method of claim 26, wherein the combining indication information further comprises an indicator indicating that the serving cell and the at least one non-serving cell send the first and second pilot signals using the radio resources and the first scrambling sequence.

28. The method of claim 25, further comprising:
receiving from a non-serving cell to which the first radio resources are not available a third data signal identical to the first data signal using fourth radio resources and a third scrambling sequence;
receiving from the non-serving cell a third pilot signal using the second radio resources and the third scrambling sequence, for channel compensation of the third data signal;
calculating a third channel estimate using the third pilot signal;
channel-compensating the third data signal using the third channel estimate; and
combining the channel-compensated signal including the first and second data signals with the channel-compensated third data signal.

29. The method of claim 28, wherein the combining indication separately indicates the at least one non-serving cell that sends the second data signal using the first radio resources and the non-serving cell that sends the third data signal using the third radio resources.

30. The method of claim 21, wherein at least one of a scheduler in the serving cell and a scheduler in a Node B for managing the serving cell and the at least one non-serving cell allocates the first radio resources and the first scrambling sequence to the serving cell and the scheduler notifies the at least one non-serving cell of the first radio resources and the first scrambling sequence.

31. An apparatus for receiving downlink data in a user equipment (UE) located in a handover region in a communication system, comprising:
a combining indication receiver for receiving from a serving cell associated with the handover region a combining indication indicating at least one non-serving cell that sends a second data signal combinable with a first data signal sent from the serving cell; and
a reception path for receiving a combined data signal including the first data signal and the second data signal sent from the serving cell and the at least one non-serving cell with a first pilot signal and a second pilot signal, the first and second data signals using first radio resources and a first scrambling sequence allocated for the serving cell, and channel-compensating the combined data signal using the first pilot signal received from the serving cell using a second radio resources and the first scrambling sequence and the second pilot signal from the at least one non-serving cell using the second radio resources and a second scrambling sequence.

32. The apparatus of claim 31, wherein the reception path receives from the serving cell control information about the first and second data signals using radio resources and the first scrambling sequence.

33. The apparatus of claim 32, wherein the control information comprises at least one of a modulation scheme, a data block size, a channel encoding scheme, and radio resources used for the first and second data signals.

34. The apparatus of claim 31, wherein the combining indication receiver receives the combining indication from the serving cell by at least one of physical layer signaling and higher-layer signaling.

35. The apparatus of claim 31, wherein the first pilot signal is sent using second radio resources and the first scrambling code by the serving cell and the second pilot signal is sent using the second radio resources and a second scrambling code by the at least one non-serving cell, and wherein the reception path comprises:
a channel estimator for calculating a first channel estimate using the first pilot signal, calculating a second channel estimate using the second pilot signal, and calculating a final channel estimate by combining the first and second channel estimates; and
a channel compensator for channel-compensating the combined data signal using the final channel estimate.

36. The apparatus of claim 31, wherein the first and second pilot signals are sent using radio resources and the first scrambling code, for channel compensation of the first and second data signals by the serving cell and the at least one non-serving cell, and wherein the reception path comprises:
a channel estimator for receiving a combined pilot signal including the first and second pilot signals, and calculating a final channel estimate using the combined pilot signal; and
a channel compensator for channel-compensating the combined data signal using the channel estimate.

37. The apparatus of claim 36, wherein the combining indication information further comprises an indicator indicating that the serving cell and the at least one non-serving cell send the first and second pilot signals using the radio resources and the first scrambling sequence.

38. The apparatus of claim 35, further comprising:
an additional reception path for receiving from a non-serving cell to which the first radio resources are not available a third data signal identical to the first data signal using fourth radio resources and a third scrambling sequence, receiving from the non-serving cell a third pilot signal for channel compensation of the third data signal using the second radio resources and the third scrambling sequence, and channel-compensating the third data signal using the third pilot signal; and a combiner for combining the channel-compensated data signal including the first and second data signals with the channel-compensated third data signal.

39. The apparatus of claim 38, wherein the combining indication separately indicates the at least one non-serving cell that sends the second data signal using the first radio resources and the non-serving cell that sends the third data signal using the third radio resources.

40. The apparatus of claim 31, wherein a scheduler in the serving cell or a scheduler in a Node B for managing the serving cell and the at least one non-serving cell allocates the first radio resources and the first scrambling sequence to the serving cell and the scheduler notifies the at least one non-serving cell of the first radio resources and the first scrambling sequence.

* * * * *